March 17, 1931. C. W. BURGER 1,796,437
ELECTRICAL GENERATOR
Filed July 18, 1929 5 Sheets-Sheet 1
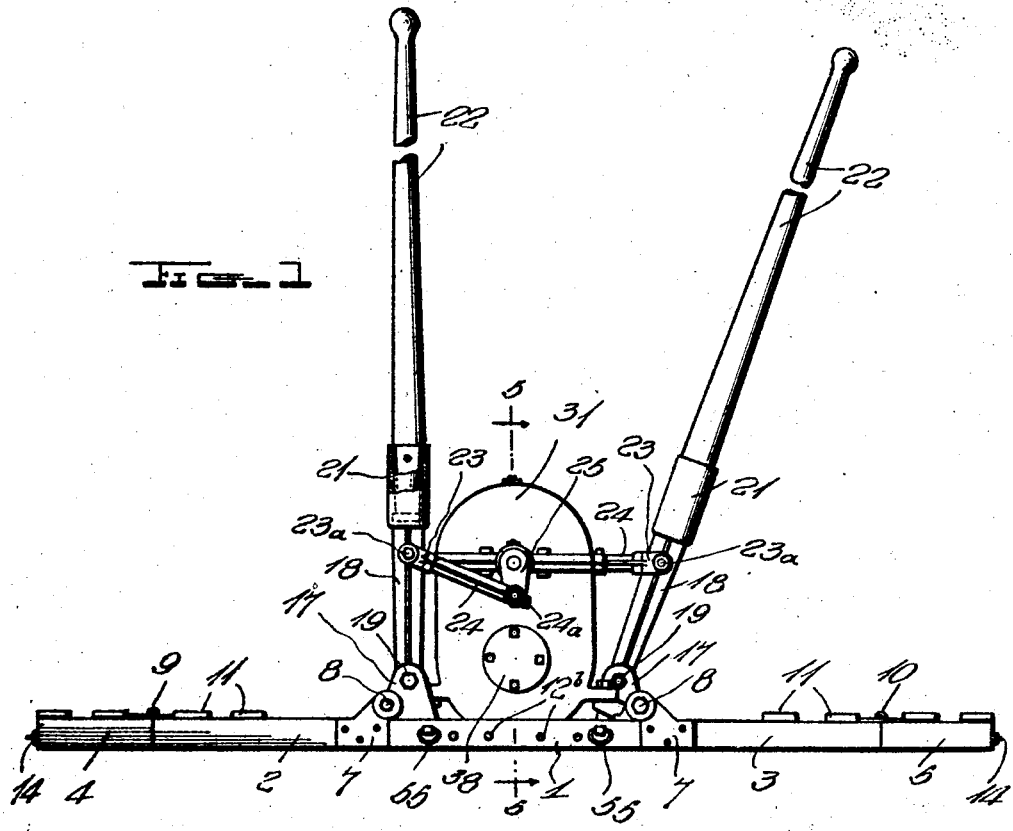
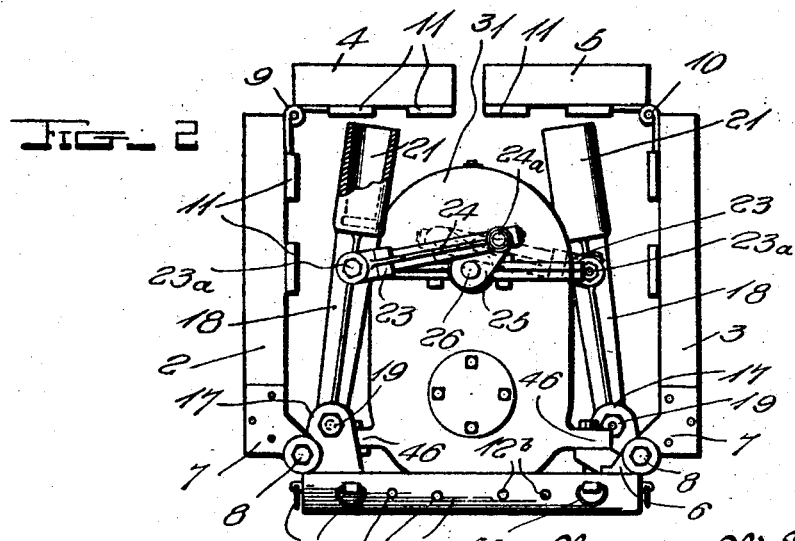
INVENTOR.
Clarence W. Burger,
BY John O. Brady
ATTORNEY.

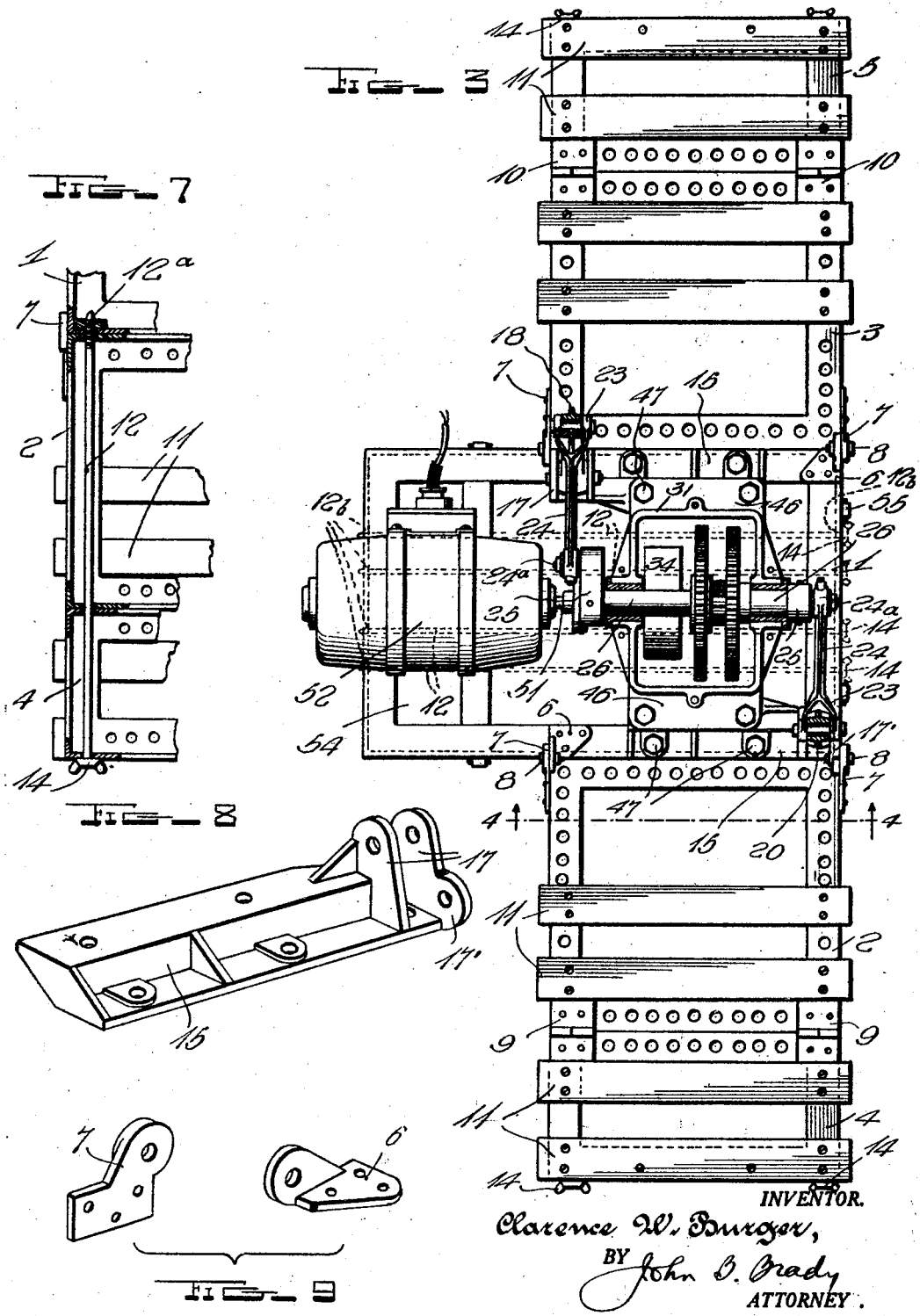

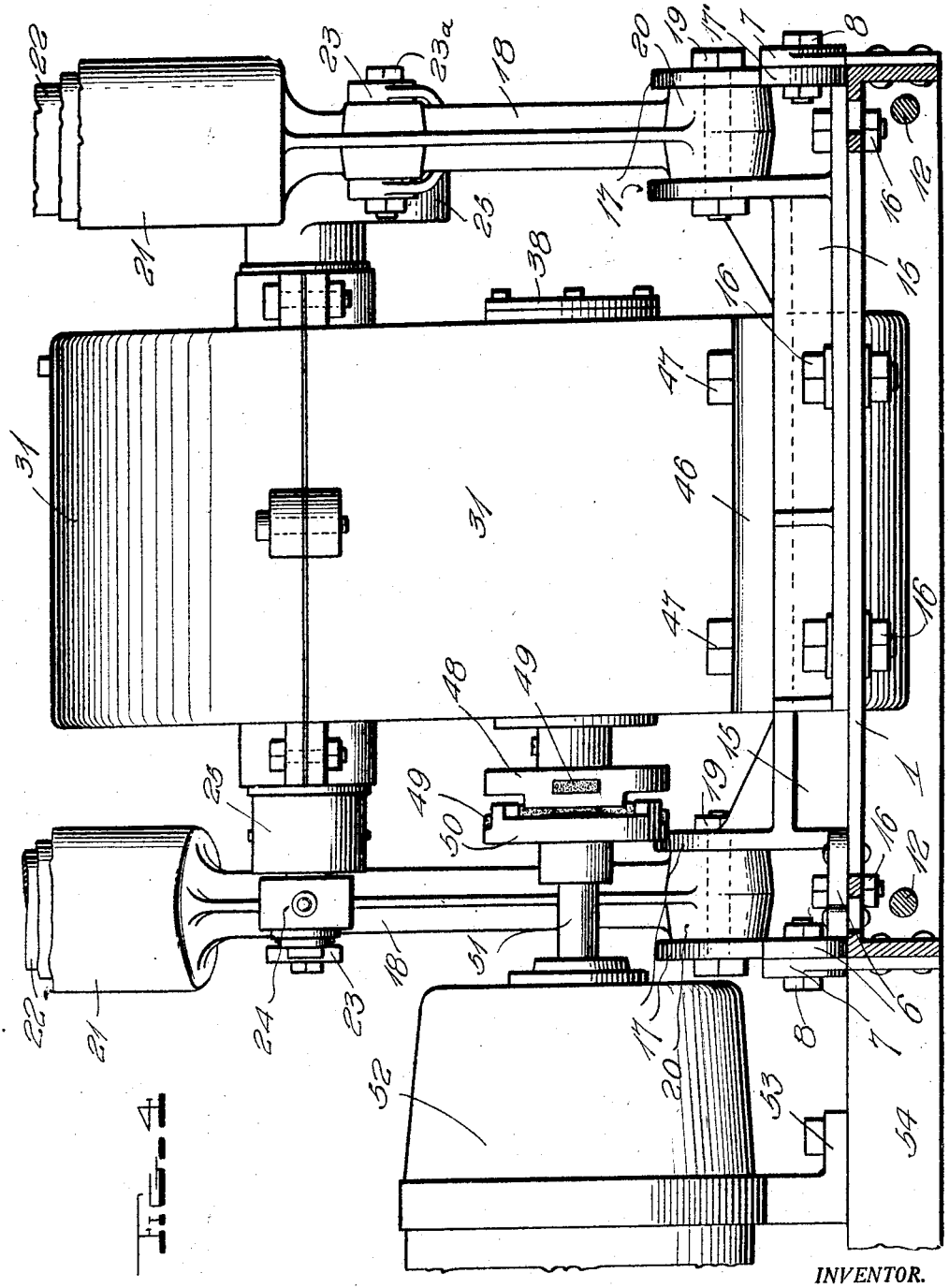

March 17, 1931. C. W. BURGER 1,796,437
ELECTRICAL GENERATOR
Filed July 18, 1929 5 Sheets-Sheet 4
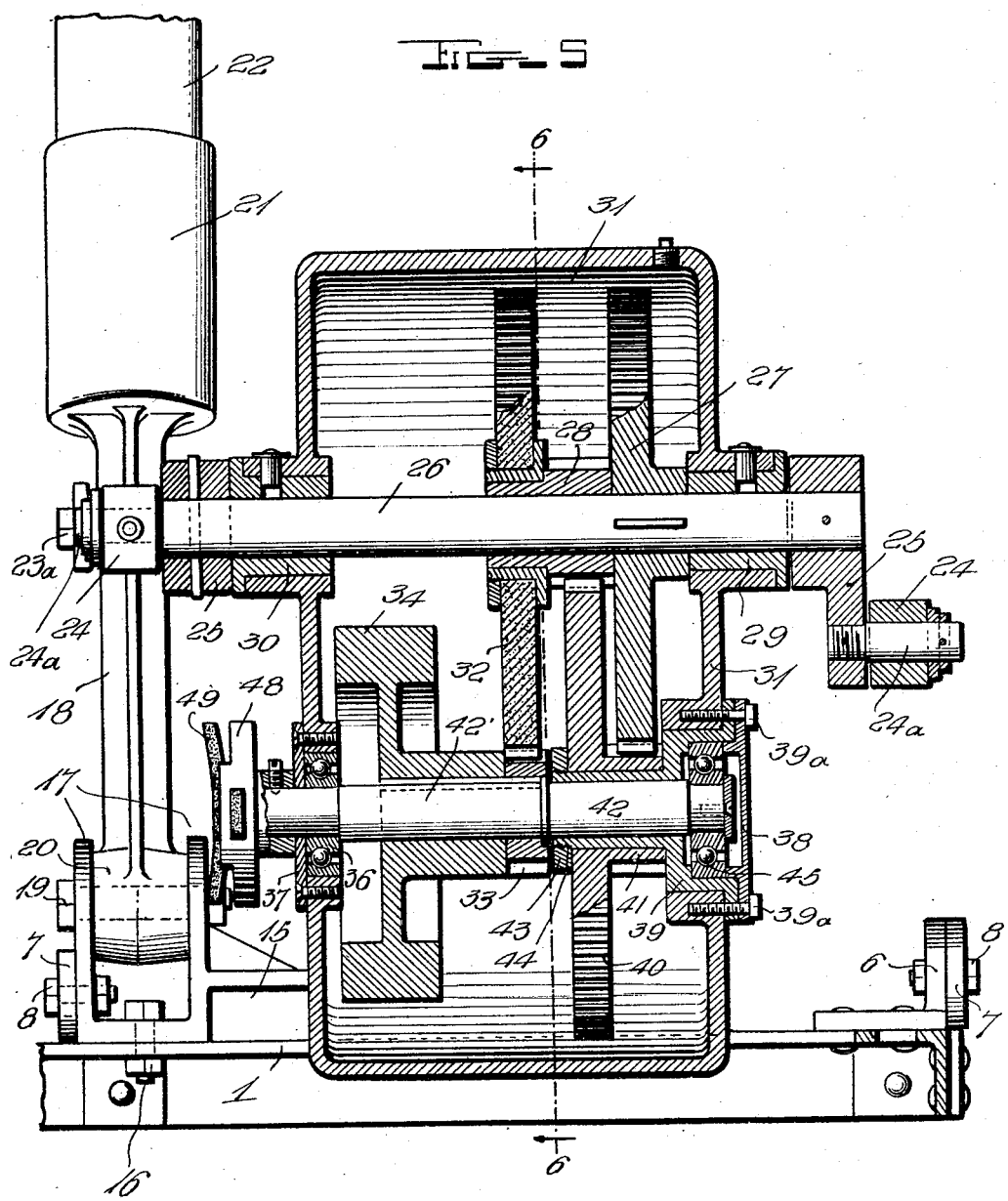
INVENTOR.
Clarence W. Burger,
BY John O. Brody
ATTORNEY.

March 17, 1931.  C. W. BURGER  1,796,437
ELECTRICAL GENERATOR
Filed July 18, 1929   5 Sheets-Sheet 5
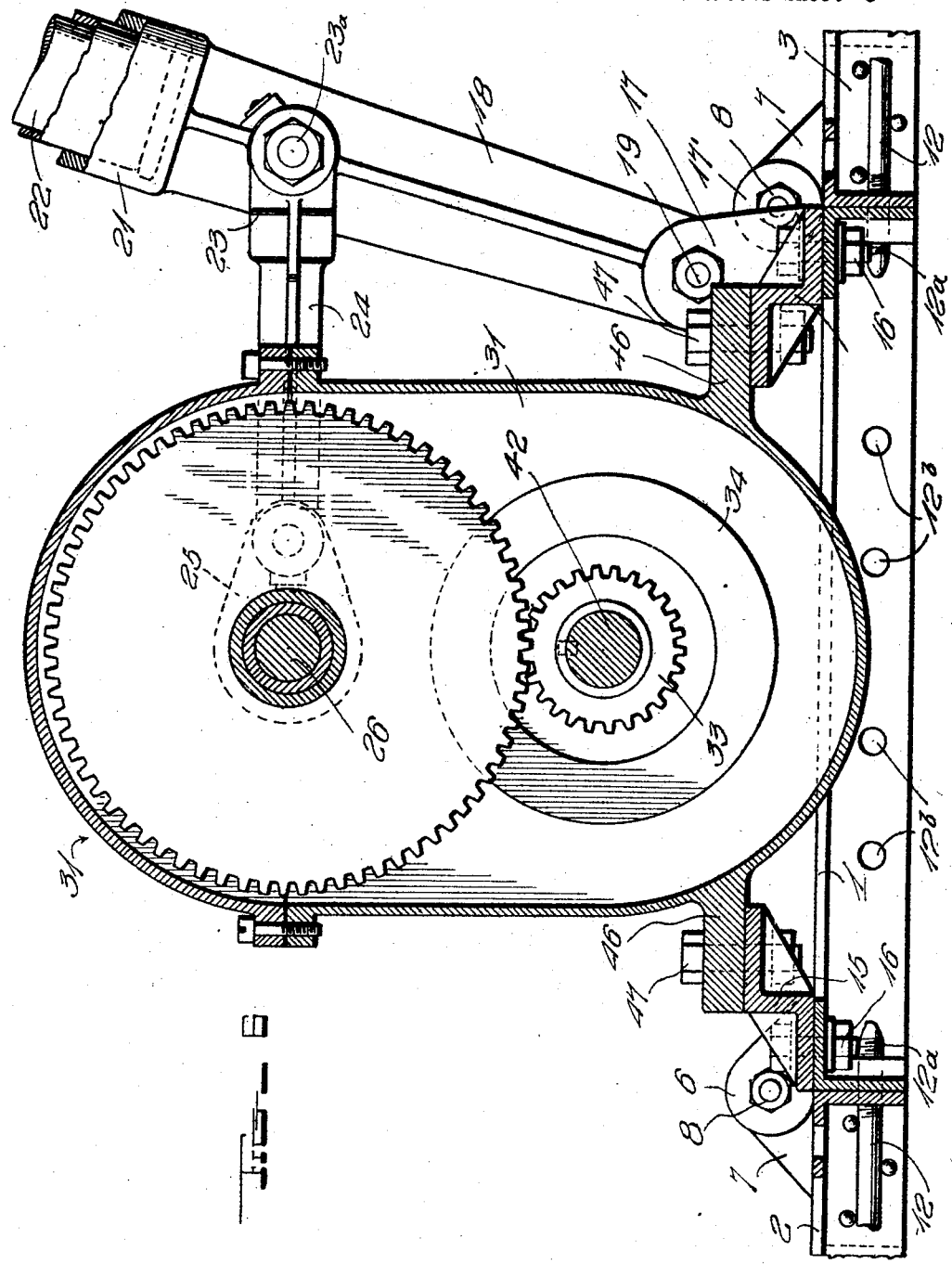
INVENTOR.
Clarence W. Burger,
BY John O. Brady
ATTORNEY.

Patented Mar. 17, 1931

1,796,437

UNITED STATES PATENT OFFICE

CLARENCE W. BURGER, OF CHERRYDALE, VIRGINIA, ASSIGNOR TO NATIONAL ELECTRICAL SUPPLY COMPANY, OF WASHINGTON, DISTRICT OF COLUMBIA, A CORPORATION OF VIRGINIA

ELECTRICAL GENERATOR

Application filed July 18, 1929. Serial No. 379,268.

My invention relates broadly to generators and more particularly to a hand driven generator for the generation of electrical energy by manual operation.

One of the objects of my invention is to provide an improved construction of hand driven generator which may be operated by a thrust motion of the arms for the generation of energy at a substantially uniform rate, particularly intended for the energization of the filament and plate circuits of electron tubes used in radio communication systems.

Another object of my invention is to provide a consctruction of hand driven generator which is readily portable and which may be carried in compact assembly and placed in use for the generation of electrical energy in the field for the supplying of the circuits of radio communication apparatus.

Still another object of my invention is to provide a construction of mounting for a hand driven generator for operation in the field wherein the generator may be driven through a system of gears arranged to multiply the rate of speed at which a pair of hand levers are manually moved thus driving the generator at relatively high speed for the generation of electrical energy at a substantially uniform rate.

A further object of my invention is to provide a mounting for a field type generator in which a pair of platforms are hingedly conencted to the generator support, which platforms are foldable to provide a box like casing for the generator during transportation and which may be unfolded to provide means on which the operators may stand while manually moving a system of levers for driving the generator system.

A still further object of my invention is to provide a construction of field generator having gears disposed between a pair of manually movable levers and a flexible connection to the generator shaft including a fly wheel system by which energy may be stored during driving strokes and rotatably imparted to the generator shaft under control of the driving strokes for uniformly rotating the shaft of the field generator for the generation of energy at a substantially constant rate.

Other and further objects of my invention reside in the arrangement of parts in the generator mounting and the assembly of gear mechanism as more fully set forth in the specification hereinafter following by reference to the accompanying drawings in which:

Figure 1 is a side elevation showing the assembled field generator system and driving mechanism therefor; Fig. 2 shows the field generator apparatus folded in compact form in preparation for transportation; Fig. 3 is a plan view of the generator, mounting platforms, support therefor and system of driving gears wherein the gear casing and parts of the bearings for the movable portions of the equipment have been shown in cross-section, the cover being removed from the gear box; Fig. 4 is a cross-sectional view taken through one of the platforms associated with the field generator on line 4—4 of Fig. 3; Fig. 5 is a cross-sectional view taken through the gear box of the generator system; Fig. 6 is a cross-sectional view through the gear box taken on line 6—6 of Fig. 5; Fig. 7 is a fragmentary view partially in cross-section looking upwardly beneath one of the platforms which connects to the generator mounting and illustrating the method of rigidly securing the hinged portions of the platform together during operation of the generator in the field; Fig. 8 is a perspective view of one of the mounting members disposed between the gear box and the platform which carries the generator; and Fig. 9 is a perspective view of the hinged members which interconnect the hinged platform with the supporting base of the generator.

My invention finds particular application in field type radio transmitters used in military operations where the complete generator is of relatively light weight and may be carried in a compact package with the parts protected by the folding of portions of platforms on each side of the generator system. I provide a pair of hand levers which are pivotally mounted with respect to the platform and manually movable by a thrust motion imparted by operators who may stand upon the platforms at each side of the generator for driving a gear system which in turn imparts rotary movement to the shaft of a generator. Intermediate the generator shaft and gear system I provide a fly wheel which serves to absorb and store energy when the hand levers are being positively moved in the course of successive strokes to carry the rotary shaft of the generator over periods of inequality in driving force for the operation of the generator at a substantially constant rate for delivering energy from the generator uniformly to the load.

Special provision is made for obtaining noiseless operation of the gear system by employing one or more non-metallic drive gears. A flexible connection is made between the drive gear system and the generator, and the driving levers are linked to the gear system in a manner by which a substantially constant driving torque may be impressed upon the rotary shaft of the generator. The assembly of the apparatus of my invention will be more clearly understood by a detailed reference to the drawings.

Referring to the drawings in detail, reference character 1 designates the main base of the hand generator to which there is hingedly connected the tread platforms 2 and 3 which also include the hingedly connected sections 4 and 5. The tread platforms 2 and 3 are hinged by the end members illustrated in Fig. 9 at 6 and 7, where members 6 in the form of brackets are mounted upon platform 1 while members 7 in the form of brackets are secured to the tread platforms 2 and 3 and secured by means of pin members 8. At diagonally opposite corners it is not required that members similar to members 6 be provided for angle members 15 hereinafter referred to are arranged to cooperate with members 7 through the agency of rearwardly extending lug member 17'. The sections 4 and 5 are hinged to the treads 2 and 3 by hinge members 9 and 10. Each of the treads 2 and 3 and sections 4 and 5 are provided with laterally extending footpads or supports in the form of strips 11. The strips are suitably spaced apart to provide adequate support for the operator of the hand generator, and the material of the platforms is suitable cut away by the boring of apertures therein for the purpose of lightening the equipment while not unreasonably impairing the strength of the platforms.

In order to strengthen the platform assembly when the field generator is in position for operation, I provide rod members 12 which may be passed through the several platforms and screw threaded, as represented at 12a, into parts of platforms 2 and 3 and center platform 1. The rod members 12 are provided with heads 14 which enable the rod members to be screwed into position for the rigid assembly of the several platforms. On opposite sides of the central platform I provide angle members 15 on the ends of which there are upstanding integral lugs 17, where one of the lug members has an apertured projecting lugs 17' which cooperates with member 7 through pin 8 to provide a suitable hinge for the platforms 2 and 3 with respect to central platform 1. The angle member 15 is secured by bolt members 16 to the opposite sides of platform 1.

Lever members 18 are provided with hub portions 20 at the extremities thereof which are pivotally mounted by means of pins 19 between the upstanding lugs 17. The lever members 18 terminate in socket connections 21 at the extremities thereof into which the ends of hand levers 22 may be inserted for moving lever members 18 about the fulcrum provided by upstanding lugs 17. Yoke members 23 are pivotally connected to the lever members 18 by means of pins 23a by which motion may be communicated through connecting rods 24 to the ends of cranks 25. I provide a pin connection 24a between the extremity of connecting rod 24 and crank 25. The cranks 25 are secured at opposite ends of a shaft 26 and disposed at substantially 90° displacement. The shaft 26 is journaled in bearings 29 and 30 carried in opposite sides of a casing 31. The casing 31 encloses all of the gears which are disposed between the driving hand levers and the generator, the casing having integral lugs 46 extending from the lower portions of the casing and secured by bolt members 47 to the ledges of the angle member 15 for the rigid mounting of the gear casing with respect to the platform 1. Motion is imparted to the shaft by thrust movement of operators on each of the hand levers 22, the operator standing upon platforms 2—4 and 3—5.

Gear 27 is keyed to revolve with shaft 26 and meshes with gear 41 which integrally connects with gear 40 which is journaled on shaft 42. The gear 40 revolves upon a sleeve 39 which is secured by screw members 39a in one wall of the casing 31, the gear 40 being retained against substantial longitudinal displacement by nut member 43 which engages screw threads 44 on the sleeve member 39. The shaft 42 is journaled at one side of the casing in ball race 45 which is retained within a journal 38. The opposite end of shaft 42 is journaled in a ball race 36 in the opposite side of casing 31 where the ball race is secured in position by housing 37. A gear 28 rigidly connected with fiber gear 32 meshes with the gear 40 and is driven thereby to drive gear 33 which is keyed to section 42' of shaft 42 to impart motion to the fly wheel 34. The employment of the fiber gear 32 avoids chatter and noise in the movement of the gears.

The arrangement of the gears is such that for relatively slow motion applied to the hand levers 22 high speed may be obtained at shaft 42 for driving coupling device 48 and in turn transmitting movement through coupling 50 and flexible connecting member 49 to the shaft 51 of generator 52. The assembly of the coupling device is such that the generator may be mounted upon an extension 54 of platform 1 as represented by 53 and the generator moved to a position where coupling 50 registers with coupling 48, the flexible member 49 being interposed therebetween for the transmission of power with sufficient flexibility as will compensate for possible inequalities in driving torque.

For purposes of transportation the driving apparatus for the hand generator may be folded into a compact package as represented in Fig. 2, where the rods 12 are removed from beneath the platforms in directions transverse to the hinged sections and stowed in positions 12b beneath the central platform 1; the hand levers removed, and the platforms folded with respect to the gear casing in such manner that a substantially rectangular carrying case is provided. Ring members 55 are provided in the platform 1 for facilitating lifting of the platform in transportation.

I have found the apparatus of my invention extremely practical as part of the equipment for portable transmitters for field operation enabling voltages for the plate and filament circuits of electron tubes to be obtained where the potential is very steady due to uniform driving motion through the system of gears and the fly wheel 34. The fly wheel 34 functions to store up energy intermediate the driving structures to secure a uniform turning torque on the generator shaft. Separate commutators carried by the generator enable desired plate and filament voltages to be obtained simultaneously.

While I have described a preferred embodiment of my invention I desire it to be understood that modifications may be made and that no limitations upon my invention are intended other than are imposed by the scope of the appended claims.

What I claim as new and desire to secure by Letters Patent of the United States is as follows:

1. A hand driven electrical generator comprising a central platform, a multiplicity of supporting platforms hingedly connected with said central platform, said supporting platforms each including a multiplicity of hinged sections, an electrical generator carried by said central platform, a plurality of hand levers pivotally mounted on said central platform, and means disposed between said hand levers and said generator for imparting rotary motion to said generator from thrust movements imparted to said hand levers from operators standing upon said supporting platforms, said hinged sections being foldable in overlapping position for housing said means when said generator is transported.

2. In a manually driven electrical generator a central platform, a pair of treads hingedly connected to opposite edges of said platform and unfoldable from superimposed relation to an extended position with respect thereto, an electrical generator carried by said central platform, a gear system supported by said platform, a pair of hand levers having pivotal connections with said central platform, links interconnecting said hand levers with said gear system, whereby thrust motion imparted to said hand levers by operators standing upon said treads when extended on each side of said platform is converted into a substantially uniform turning torque for driving said generator.

3. In a manually operated electrical generator, a supporting platform, a pair of treads hingedly connected to opposite edges of said supporting platform and unfoldable from superimposed relation to an extended position on opposite sides of said platform, each of said treads including a plurality of sections, an electrical generator carried by said central platform, a system of gears connected to impart rotary motion to said electrical generator, hand levers fulcrumed at their extremities on said central platform, links extending between said hand levers and said system of gears, whereby thrust movement imparted to said hand levers by operators standing upon said treads when in extended position on each side of said supporting platform imparts rotary movement to said system of gears thereby transferring rotary movement at a substantially uniform turning torque to the shaft of said generator independently of the thrust movement in said hand levers.

4. In a manually driven electrical generator, a central platform, an electrical generator supported thereon, means mounted upon said central platform for manually driving said generator and a pair of treads hingedly connected to opposite edges of said platform said treads each including a multiplicity of hingedly connected sections foldable from a plane coincident with the plane of said central platform to a position enclosing said generator for establishing a readily transportable generator package.

5. In a manually operated electrical generator, a supporting platform, an electrical generator carried by said platform, a system of gears mounted on said platform and connected with said generator for imparting a driving torque thereto from thrust movements impressed thereon, a pair of treads hingedly connected at opposite edges of said platform and collapsible or extensible with respect thereto, and means projectable through said treads and through said central platform for establishing a rigid foundation for said generator when said treads are extended with respect to said platform.

6. In a manually operated electrical generator, a central platform, an electrical generator supported by said platform, a system of gears arranged adjacent said generator for imparting rotary movement to said generator from thrust movements applied thereto, a pair of treads hingedly connected to opposite edges of said platform and collapsible or extensible with respect thereto, and rod members projectable through said treads and adapted to be secured with respect to said central platform for rigidly interconnecting said treads and providing a solid foundation for said generator when said treads are extended with respect to said platform.

7. In a manually operated electrical generator, a platform, a pair of operators' platforms hingedly connected with said platform, an electrical generator mounted upon said first mentioned platform, a system of gears connected to said generator and supported by said first mentioned platform, a pair of hand levers fulcrumed at diagonally opposite positions on said first mentioned platform under control of operators located on said operators' platforms, said system of gears including a shaft having cranks at opposite ends thereof connected to said levers, a countershaft geared to revolve simultaneously with said aforementioned shaft, means carried by said countershaft for delivering energy intermediate the thrust movements of said hand levers, and a resilient connection between said countershaft and said generator for imparting substantially constant rotary motion to said generator independent of irregularities in the movement of said hand levers.

In testimony whereof I affix my signature.

CLARENCE W. BURGER.